US005878024A

United States Patent [19]

Kobayashi et al.

[11] Patent Number: 5,878,024

[45] Date of Patent: Mar. 2, 1999

[54] OPTICAL DISC, APPARATUS AND METHOD FOR RECORDING AND REPRODUCING DATA

[75] Inventors: Shoei Kobayashi; Tamotsu Yamagami, both of Kanagawa; Toru Takeda, Saitama; Hiroshi Ogawa, Kanagawa; Yoichiro Sako, Chiba, all of Japan

[73] Assignee: Sony Corporation, Tokyo, Japan

[21] Appl. No.: 964,971

[22] Filed: Nov. 5, 1997

Related U.S. Application Data

[62] Division of Ser. No. 664,951, Jun. 14, 1996.

[30] Foreign Application Priority Data

| | | | |
|---|---|---|---|
| Jun. 15, 1995 | [JP] | Japan | 7-148499 |
| Aug. 4, 1995 | [JP] | Japan | 7-200081 |
| Aug. 31, 1995 | [JP] | Japan | 7-223181 |

[51] Int. Cl.[6] .......... G11B 7/24

[52] U.S. Cl. .......... 369/275.3

[58] Field of Search .......... 369/275.3, 44.26, 369/44.32, 54, 58, 44.13

[56] References Cited

U.S. PATENT DOCUMENTS

| | | | |
|---|---|---|---|
| 4,392,219 | 7/1983 | Yokozawa et al. | 369/44 |
| 4,807,211 | 2/1989 | Getreuer | 369/44.26 |
| 4,942,565 | 7/1990 | Lagadec | 369/59 |
| 4,982,398 | 1/1991 | Yamamoto et al. | 369/119 |
| 5,023,856 | 6/1991 | Raaymakers et al. | 369/32 |
| 5,210,738 | 5/1993 | Iwata et al. | 369/275.1 |
| 5,247,507 | 9/1993 | Morimoto et al. | 369/44.26 |
| 5,339,302 | 8/1994 | Takashashi et al. | 369/54 |
| 5,377,178 | 12/1994 | Saito et al. | 369/124 |
| 5,506,824 | 4/1996 | Fairchild et al. | 369/48 |
| 5,508,985 | 4/1996 | Fairchild et al. | 369/59 |
| 5,572,507 | 11/1996 | Ozaki et al. | 369/275.4 |
| 5,587,901 | 12/1996 | Yamagami et al. | 369/275.3 |
| 5,615,185 | 3/1997 | Horikiri | 369/44.36 |
| 5,615,205 | 3/1997 | Belser | 369/275.4 |
| 5,682,365 | 10/1997 | Carasso et al. | 369/59 |
| 5,684,772 | 11/1997 | Yamagami et al. | 369/59 |

FOREIGN PATENT DOCUMENTS

| | | | |
|---|---|---|---|
| 487321 | 5/1992 | European Pat. Off. | 369/275.3 |

OTHER PUBLICATIONS

U.S. Patent Application No. 08/664,951 filed on Jun. 14, 1996.

U.S. Patent Application No. 08/964,874 filed on Nov. 5, 1997.

U.S. Patent Application No. 08/964,613 filed on Nov. 5, 1997.

*Primary Examiner*—Mabil Hindi

*Attorney, Agent, or Firm*—Limbach & Limbach L.L.P.; Seong-Kun Oh

[57] ABSTRACT

An optical disc having address information recorded in a wobbling manner is arranged to record or reproduce data at correct positions. The optical disc includes at least one track on which data is recorded and which is previously formed as a pregroove wobbled in accordance with an address information, where the track has a plurality of frames wobbled in accordance with the address information, and further where a plurality of sync marks is formed in each of said frames by wobbling said pregroove at a center frequency of frequencies of wobbling with the address information.

19 Claims, 18 Drawing Sheets

LASER SPOT

ADDRESS

MEANDERING CYCLE

| | | | | | |
|---|---|---|---|---|---|
| NUMBER OF BITS | 4 | 8 | 8 | 8 | 14 |
| BIT POSITION | 0000<br>1234 | 00000111<br>56789012 | 11111112<br>34567890 | 22222222<br>12345678 | 23333333333444<br>90123456789012 |
| DATA | SYNC | CLUSTER H | CLUSTER L | SECTOR | CRC REMAINDER |

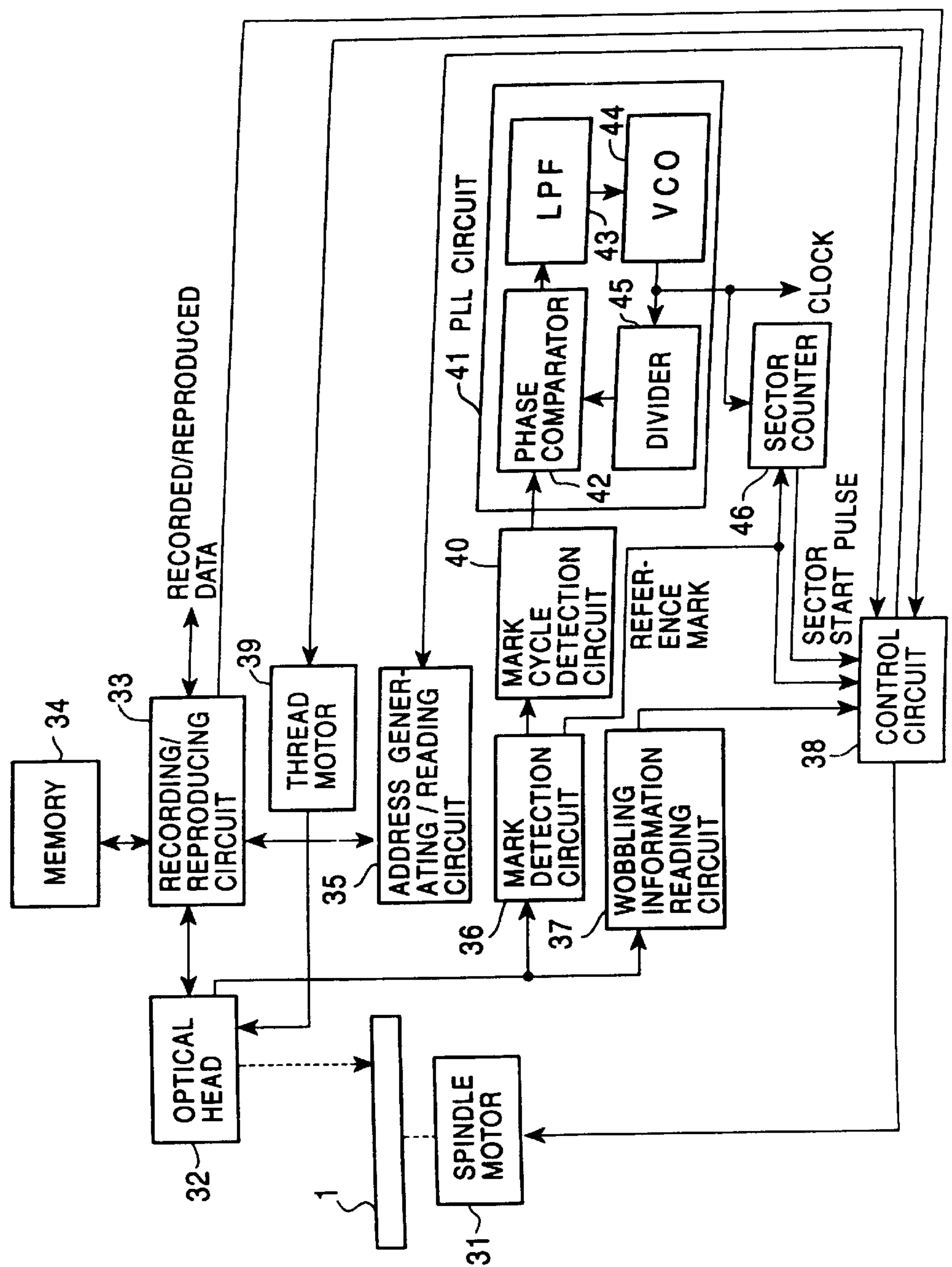
FIG.14
RECORDED/REPRODUCED DATA
MEMORY
34
RECORDING/ REPRODUCING CIRCUIT
33
THREAD MOTOR
39
ADDRESS GENER-ATING / READING CIRCUIT
35
MARK DETECTION CIRCUIT
36
WOBBLING INFORMATION READING CIRCUIT
37
MARK CYCLE DETECTION CIRCUIT
40
41 PLL CIRCUIT
PHASE COMPARATOR
42
LPF
43
VCO
44
DIVIDER
45
CLOCK
SECTOR COUNTER
46
REFER-ENCE MARK
SECTOR START PULSE
CONTROL CIRCUIT
38
OPTICAL HEAD
32
SPINDLE MOTOR
31
1

LINKING FRAME STRUCTURE
CLUSTER
16 kB
16 kB
16 kB
LINKING 2 FRAMES
87B
87B
FS 2B
POST-AMBLE 1B
POST-BUFF-ER 2B
PRE-BUFF-ER 2B
ALPC 16B
VFO 64B
FS 2B
VFO 38B
SECURITY CONTROL 4B
ADDRESS 8B
VFO 19B
ADDRESS 8B
SYNC 2B
ADDRESS 8B:(AM2/ADDRESS4/CRC2)

OPTICAL DISC, APPARATUS AND METHOD FOR RECORDING AND REPRODUCING DATA

This is a divisional of application Ser. No. 08/664,951, filed Jun. 14, 1996 pending.

BACKGROUND OF THE INVENTION

1. Field of the Invention

The present invention relates generally to optical discs, apparatuses and methods for recording and reproducing data and, more particularly, to an optical disc in which a pregroove is wobbled to record address information so that data can be recorded or reproduced at correct positions, and a recording apparatus and a method which enable data to be recorded or reproduced at correct positions on the optical disc.

2. Description of the Related Art

When data is recorded on a disc, there is a need to record address information so as to enable the data to be recorded at predetermined positions. In some case, such address information is recorded by wobbling.

That is, as shown in FIG. 20, a track on which data is recorded is previously formed as a pregroove, and side walls of this pregroove is caused to wobble (meander) in accordance with address information. Addresses can be read from wobbling information recorded in this manner, thereby enabling data to be recorded at desired positions.

The method of recording addresses by wobbling as described above entails a problem described below. In a state where no data is recorded in the pregroove (track), addresses can be accurately read out to enable data to be recorded at correct positions. However, if data is recorded by forming, in the track (pregroove), regions (pits) differing in reflectivity from other regions (regions in which no pits are formed) (for example, in accordance with the recording method for discs capable of rerecording), changes in reflectivity due to wobbling and changes in reflectivity due to recording data (pits) interfere with each other to make it difficult to correctly reproduce addresses (wobbling information). As a result, it is difficult to record data at correct positions.

Then, a method may be taken into consideration in which address information is included in the data to be recorded on the track, and in which recording positions are determined on the basis of the address information.

However, in the case of recording, for example, data for computers, the data is not continuously recorded in serial order from the starting end to the terminal end of the track (pregroove) but intermittently recorded at predetermined positions, as shown in FIG. 21.

That is, the track is divided into a plurality of cluster regions (or sectors) to record a cluster of data in each of the cluster regions. Each of clusters of data recording in this manner do not follow immediately after the preceding cluster of data.

If data is recorded intermittently in this manner, addresses are also recording intermittently with respect to clusters. However, some amount of error occurs in determining the recording position of each cluster of data. Therefore, if recording is performed on the basis of addresses previously recorded, errors of the recording position may accumulate to such an amount that interference occurs between adjacent clusters (sectors), as shown in FIG. 22. That is, the recording region for a terminal end portion of one cluster overlaps a start portion of the next cluster.

To prevent such interference, a buffer region in which essentially no data is recorded may be formed between each adjacent pair of clusters, as shown in FIG. 22, for example. However, the effective recording capacity of the disc is reduced if such a buffer region is formed.

Thus, with respect to the disc in which data is recorded randomly (intermittently) as shown in FIG. 21, it is difficult to record addresses by wobbling and to correctly record data at predetermined positions on the basis of the addresses.

The density of wobbling information is much lower than that of recorded or reproduced information. Based on such wobbling information, therefore, the recording position of each sector cannot be determined finely and an error can occur in determining the recording position of each sector. Also for this reason, the possibility of interference between adjacent sectors is not negligible. Also, there is a need to absorb jitter due to an eccentricity or the like. To avoid such undesirable conditions, a substantially large amount of non-recording buffer area is required. Use of a large recording buffer area is disadvantageous considering the data capacity. A considerably redundant system results thereby, such that it is difficult to perform high-density random recording and reproduction.

Further, random data recording and reproduction on a programmable optical disc necessitates formation of a variable frequency oscillator (VFO) region or the like in which data for pulling into a phase lock loop (PLL) circuit for generating a clock as a basis for recording and reproduction is recorded as well as addresses such as track addresses and sector addresses. In the case of a system for recording data including addresses and so on, it is necessary to set, in front of each recording sector, a linking sector in which dummy data for changing a preceding reproducing state to a recording state is recorded.

As described above, in order to actually record data randomly on an optical disc, it is necessary to form regions in which addresses for the data and VFO data are recorded as well as essential regions for recording data. The methods heretofore proposed, however, increase the overhead, so that the effective recording capacity of the optical disc is reduced.

In the conventional compact disc read only memories (CD-ROM) and the like, a sync signal "frame sync" is recorded in a certain cycle. Sync system processing is performed on this unit sync signal. However, if a read only memory (ROM) disc and a random access memory (RAM) disc are formed so as to have the same format with the addition of a header, the header disables the sync system from being continued with respect to unit recording sectors and makes the sync system processing difficult.

SUMMARY OF THE INVENTION

In view of these circumstances, an object of the present invention is to provide an optical disc in which addresses are formed by wobbling and in which data can be recorded at correct positions, and a recording apparatus and a method enabling such recording.

To achieve this object, according to one aspect of the present invention, there is provided an optical disc comprising at least one track on which data is recorded and which is previously formed as a pregroove wobbled in accordance with address information, the track being divided into a plurality of sectors, a plurality of sync marks being formed in each of the sectors.

According to another aspect of the present invention, there is provided an optical disc comprising at least one track on which data is recorded and which is previously formed as a pregroove wobbled in accordance with address information, the track having a plurality of frames wobbled in accordance with the address information, a plurality of sync marks being formed in each of the frames by wobbling the pregroove at a center frequency of frequencies of wobbling with the address information.

According to still another aspect of the present invention, there is provided an optical disc comprising at least one track on which data is recorded and which is previously formed as a pregroove wobbled in accordance with address information, the track having a plurality of frames wobbled in accordance with the address information, a plurality of sync marks being formed in each of the frames by wobbling the pregroove at a frequency higher than a frequency of wobbling with the address information.

According to yet another aspect of the present invention, there is provided an optical disc comprising at least one track irradiated with light to record data thereon and to reproduce data recorded thereon, the track being divided into a plurality of clusters as units of data recorded or reproduced, each of the clusters being divided into a data area and a link area between data areas, and each of the data area and the link area being formed of unit frames separated by a sync signal.

According to a further aspect of the present invention, there is provided an apparatus for at least one of recording data on an optical disc and reproducing data from the optical disc, the optical disc having at least one track on which data is recorded, which is previously formed as a pregroove wobbled in accordance with address information, and which is divided into a plurality of sectors in each of which a plurality of sync marks are formed, at least one of the sync marks in one round of the track being formed as a reference mark different from the other sync marks, the apparatus comprising means for either recording data on the optical disc or reproducing data from the optical disc, detection means for detecting the sync marks and the reference mark from a reproduction output from the means for at least one of recording and reproducing, and signal generation means for generating a start signal representing a start position of each of the sectors according to the sync marks and the reference mark detected by the detection means.

According to still a further aspect of the present invention, there is provided an apparatus for at least one of recording data on an optical disc and reproducing data recorded on the optical disc, the optical disc having at least one track on which data is recorded, which is previously formed as a pregroove wobbled in accordance with address information, and which has a plurality of frames wobbled in accordance with the address information, a plurality of sync marks being formed in each of the frames, the frames forming a plurality of clusters as units of data recorded or reproduced, the apparatus comprising means for at least one of recording data on the optical disc and reproducing data from the optical disc, detection means for detecting the sync marks from a reproduction output from the means for at least one of recording and reproducing, read means for reading the address information recorded by wobbling, and signal generation means for generating a start signal representing a start position of each of the clusters according to the sync marks detected by the detection means and the address information read by the read means.

According to still a further aspect of the present invention, there is provided a method of at least one of recording data on an optical disc and reproducing data from the optical disc, the optical disc having at least one track on which data is recorded, which is previously formed as a pregroove wobbled in accordance with address information, and which is divided into a plurality of sectors in each of which a plurality of sync marks are formed, at least one of the sync marks in one round of the track being formed as a reference mark different from the other sync marks, the method comprising the steps of detecting the sync marks and the reference mark from a reproduction output from the optical disc, and generating a start signal representing a start position of one of the sectors according to the sync marks and the reference mark detected in the detection step.

According to still a further aspect of the present invention, there is provided a method of recording data on an optical disc and reproducing data recorded on the optical disc, the optical disc having at least one track on which data is recorded, which is previously formed as a pregroove wobbled in accordance with address information, and which has a plurality of frames wobbled in accordance with the address information, a plurality of sync marks being formed in each of the frames, the frames forming a plurality of clusters as units of data recorded or reproduced, the method comprising the steps of detecting the sync marks from a reproduction output from the optical disc, reading the address information recorded by wobbling, and generating a start signal representing a start position of one of the clusters according to the sync marks detected in the detecting step and the address information read in the reading step.

BRIEF DESCRIPTION OF THE DRAWINGS

FIG. 10 is a diagram of a sector format;

FIG. 14 is a block diagram of an example of an optical disc recording/reproducing apparatus in accordance with the present invention;

DESCRIPTION OF THE PREFERRED EMBODIMENTS

Figure 1A:
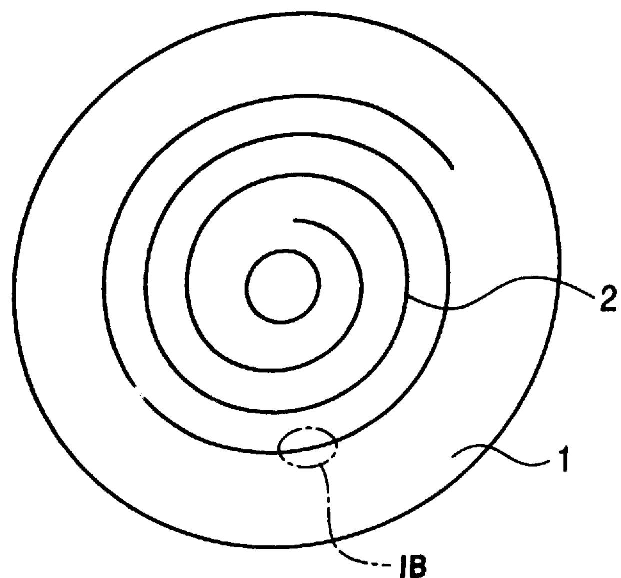
FIG. 1A and FIG. 1B are diagrams of the configuration of an example of a data recording disc in accordance with the present invention.
Figure 1B:
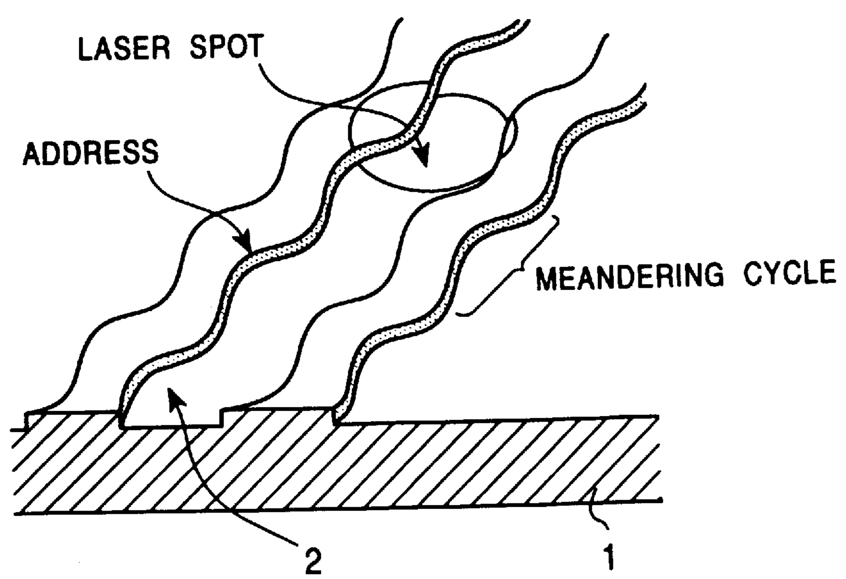

FIG. 1A and FIG. 1B show the configuration of an example of a data recording disc in accordance with the present invention. As shown in FIG. 1A, a pregroove 2 is previously formed on a disc (optical disc) 1 so as to extend spirally from its inner end to its outer end. Needless to say, concentric grooves may be formed as an alternative to the spiral pregroove 2.

The pregroove 2 has its left and right side walls formed in an wobbling manner in accordance with address information such as to meander in a predetermined cycle (for example, of 45.4 $\mu$s), as partially illustrated in an enlarged view in FIG. 1B.

Figure 2:
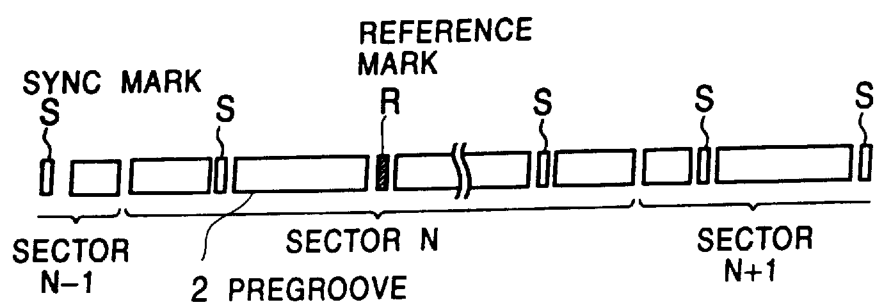
FIG. 2 is a diagram showing sync marks and a reference mark.

As shown in FIG. 2, a plurality of sync marks S are previously formed in constant cycles in each of sectors formed in the pregroove 2. For example, 200 sync marks S are formed in one track (one round). Sync marks S are different in form (discriminable) from pits which are formed in accordance with data recorded in the pregroove 2.

Among the plurality of sync marks, one reference mark R is formed with respect to each track round.

Figure 3:
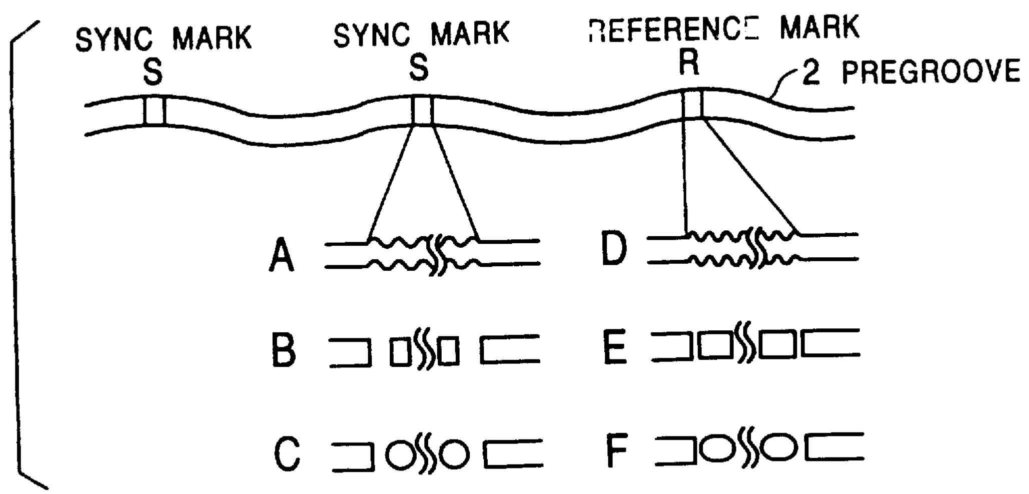
FIG. 3 is a diagram of more detailed examples of the sync mark and the reference mark.

FIGS. 3(A) to 3(F) illustrate examples of the configurations of the sync mark and the reference mark. Referring to FIG. 3(A), the sync mark is formed by wobbling the pregroove at a frequency higher than the frequency of wobbling for address information. On the other hand, referring to FIG. 3(D), the reference mark is formed by wobbling the pregroove at a frequency higher than the frequency of wobbling for the sync mark.

In the example shown in FIG. 3(B), sync mark S is formed by discontinuously forming the pregroove 2. In this case, reference mark R is formed so that the spacing of discontinuities for reference mark R is different from the spacing of discontinuities for sync mark S, as shown in FIG. 3(E).

In the example shown in FIG. 3(C), sync mark S is formed as pits. In this case, reference mark R is formed by pits which differ in size from those forming sync mark S, as shown in FIG. 3(F).

Figure 4:
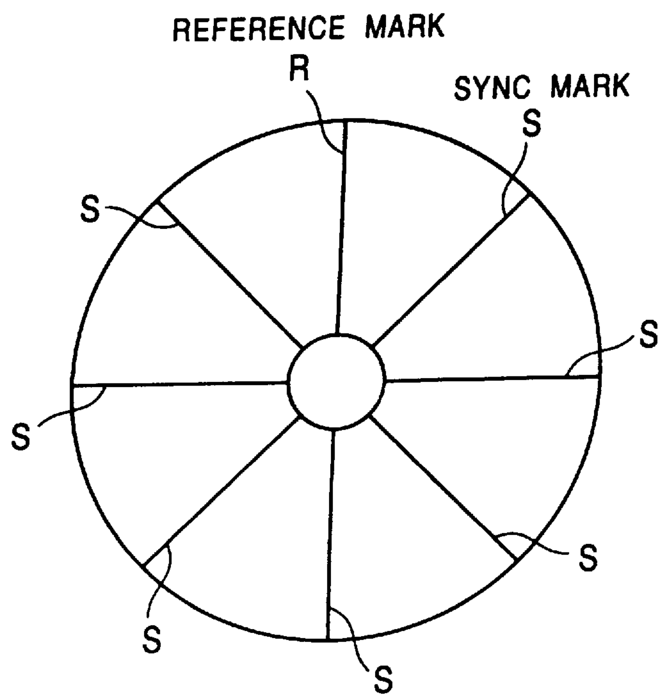
FIG. 4 is a diagram of the positions of sync marks and reference marks on a constant angular velocity disc.

If the disc 1 is a constant angular velocity (CAV) disc having a constant angular velocity of rotation, sync marks S and reference marks R are arranged as shown in FIG. 4. That is, each of sync marks S and reference mark R in each track is disposed on the same radial line as the corresponding marks in the other tracks. Sync marks S are disposed on a plurality of radial lines while reference marks R are disposed on one radial line since only one reference mark R is formed in each round.

If the disc 1 is a CAV disc, the period (interval) of the sync marks S can be set regardless of the length of sectors, as shown in FIG. 2. In such a case, a sector boundary appears between one sync mark and the subsequent sync mark, as shown in FIG. 2.

Figure 5:
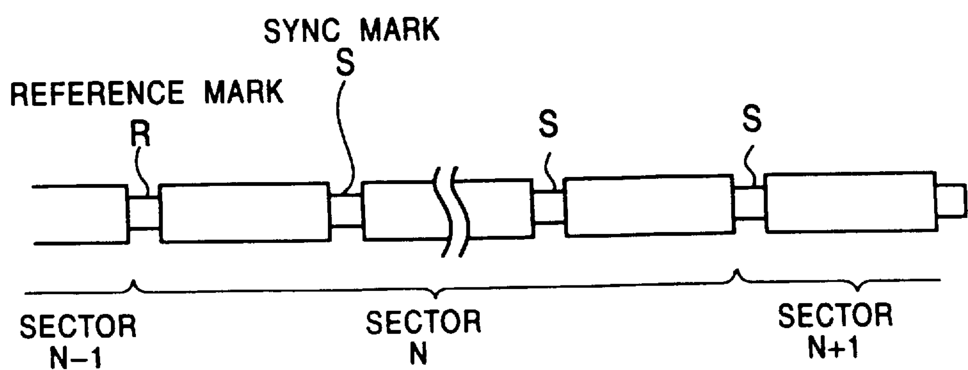
FIG. 5 is a diagram showing sync marks and a reference mark of a constant linear velocity disc.

If the disc 1 is a constant linear velocity (CLV) disc having a constant linear velocity, m sync marks complete one sectors as shown in FIG. 5. That is, the length of each sector is set so as to correspond to an integer-multiple of the period (interval) of sync marks S. Also, sync mark S or reference mark R is always set at the starting end of each sector. Reference mark R is disposed at the starting end of the first one of the sectors in each track (corresponding to one round of pregroove 2).

Figure 6:
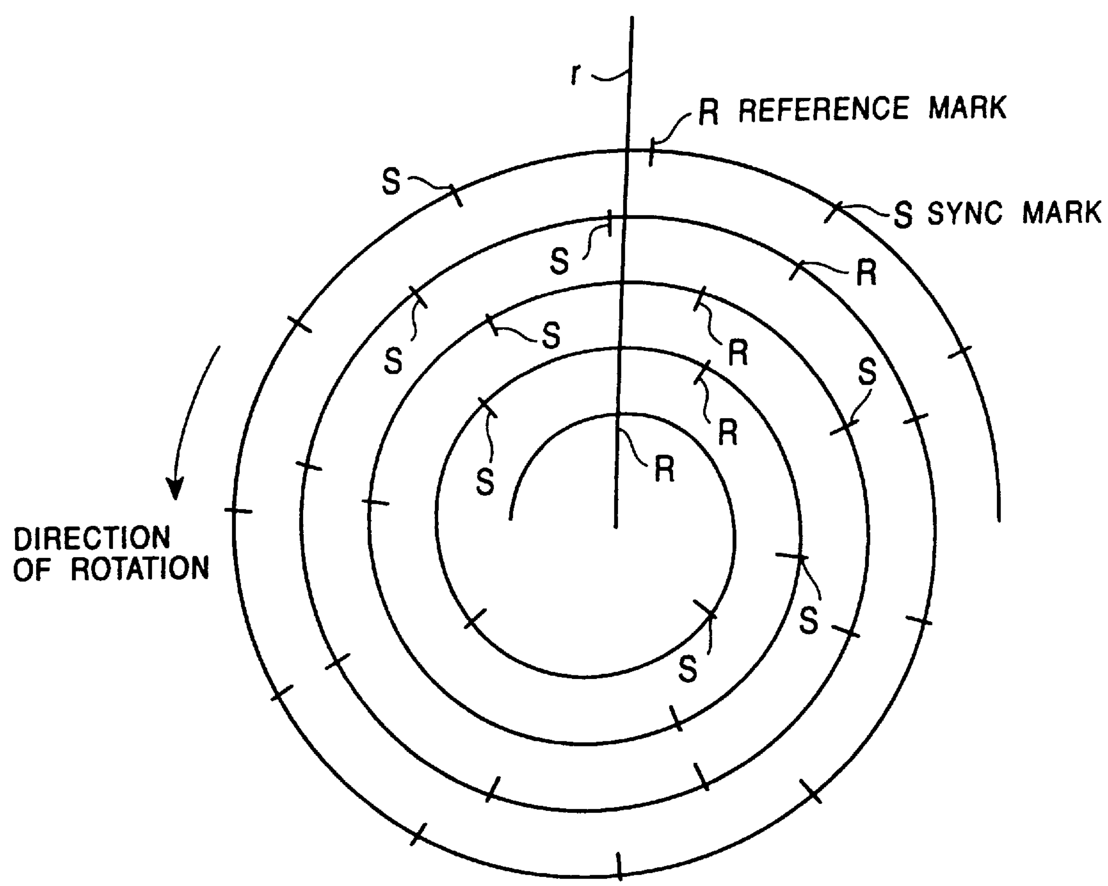
FIG. 6 is a diagram of the positions of sync marks and reference marks on a constant linear velocity disc.

If the thus-formed CLV disc 1 is rotated counterclockwise, the first mark positioned on the right-hand side of one radius r in each track is formed as reference mark R, as shown in FIG. 6. The other marks are sync marks S.

In this arrangement, reference marks R are not aligned on one radial line as in the case of the CAV disc shown in FIG. 4 but each sector in each track can be identified by counting the number of sectors on the basis of the reference mark R.

Figure 7:
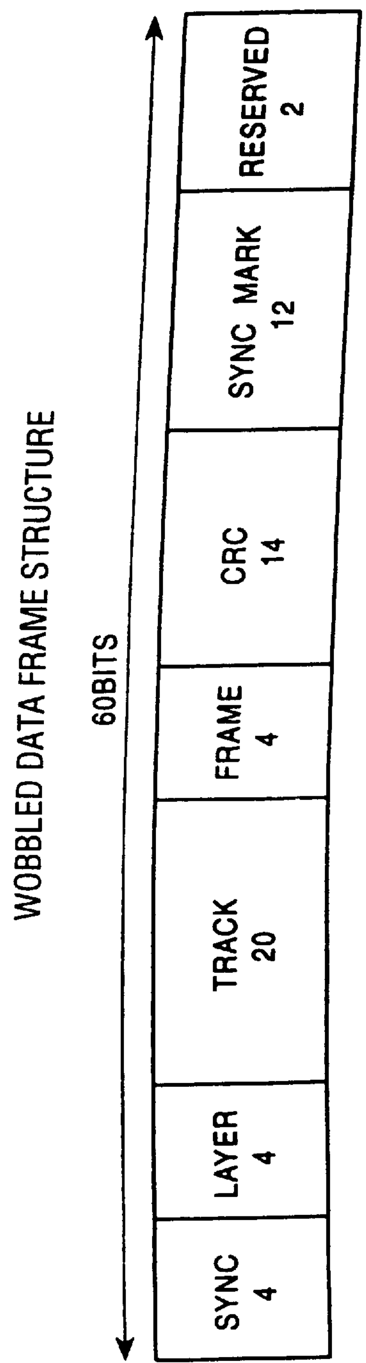
FIG. 7 is a diagram of an example of a wobbling address frame structure.

Each track has a plurality of wobbling address frames each having a structure such as shown in FIG. 7.

FIG. 7 shows a wobbling address frame structure. As shown in FIG. 7, each wobbling address frame is formed of sixty bits, and initial four bits thereof form a sync signal (SYNC) indicating the starting end of the wobbling address frame. The next four bits form a layer signal (LAYER) indicating one of a plurality of recording layers. The following twenty bits are used for track addresses. The following four bits represent the frame number. The following fourteen bits form an error-correcting code (cyclic redundancy code (CRC)). An error-detecting code for signals other than the sync signal (SYNC) and clock sync mark (SYNC MARK) areas described below are recorded as CRC. The following twelve bits are for clock sync mark areas. Final two bits (RESERVED) are reserved for a future need.

For example, eight wobbling address frames are formed with respect to one track round and are recorded in accordance with the CAV disc format.

Figure 8:
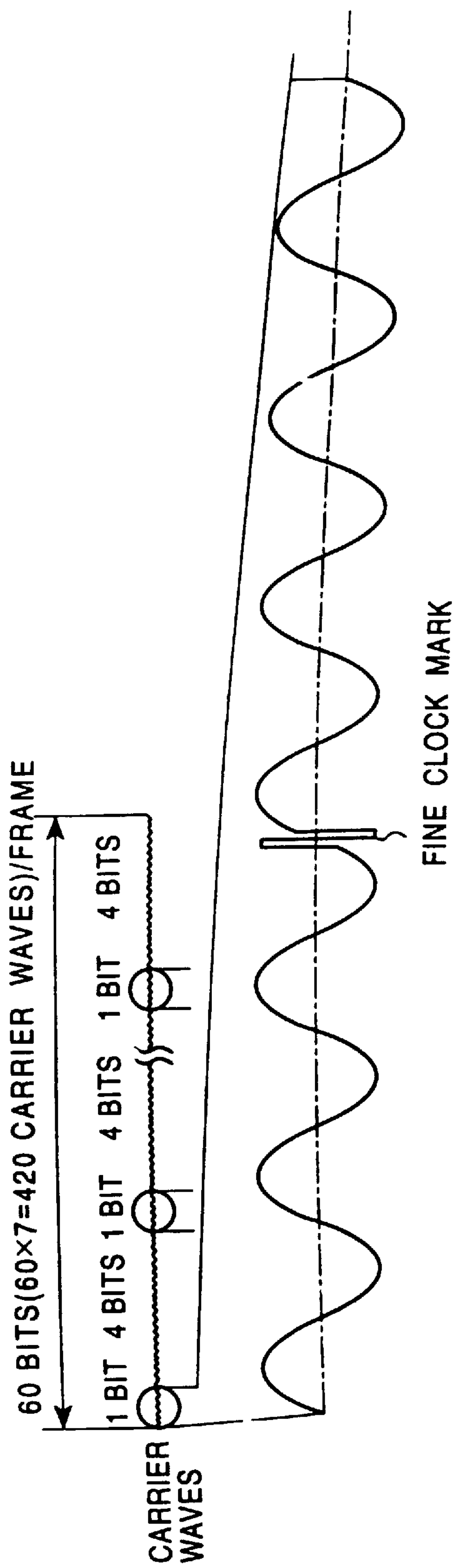
FIG. 8 is a diagram of clock sync mark areas and clock sync marks.

FIG. 8 shows a clock sync mark area and a clock sync mark (FINE CLOCK MARK). In each frame, data of sixty bits is recorded. If as shown in FIG. 8 one bit is represented by seven waves (carrier waves) in a signal having a predetermined frequency, 420 waves exist in one frame. If the optical disc is rotated at 1200 rpm, the frequency of this carrier is 67.2 kHz.

As shown in FIG. 8, in the wobbling address frame shown in FIG. 7, each of the bits for each clock sync mark areas is followed by four bits for address information. That is, the data is recorded in a cycle of five bits. The first one of each group of five bits is a seven-wave carrier containing a clock sync mark (FINE CLOCK MARK), and the other four bits form a section modulated with effective address data including no fine clock mark. Thus, fine clock marks formed by twelve bits (twelve marks) and data of forty eight bits (forty eight data items) are recorded in one frame. During one revolution of the disc (one track), 96 (=12×8) fine clock marks are recorded.

Address information is modulated in a biphase modulation manner. The pregroove is then wobbled by frequency modulation with the address information. The wobbling frequency of the pregroove in each clock sync mark area is set to the center frequency of the frequencies of modulation of the address information or to a frequency higher than the frequency of modulation of the address information.

Each clock sync mark is one-wavelength-wobbled in a mark length of 6 to 8 T, as shown in FIG. 8, if recorded or reproduced data is modulated by eight to fourteen modulation (8–14 modulation) for the compact disc or the like.

Figure 9:
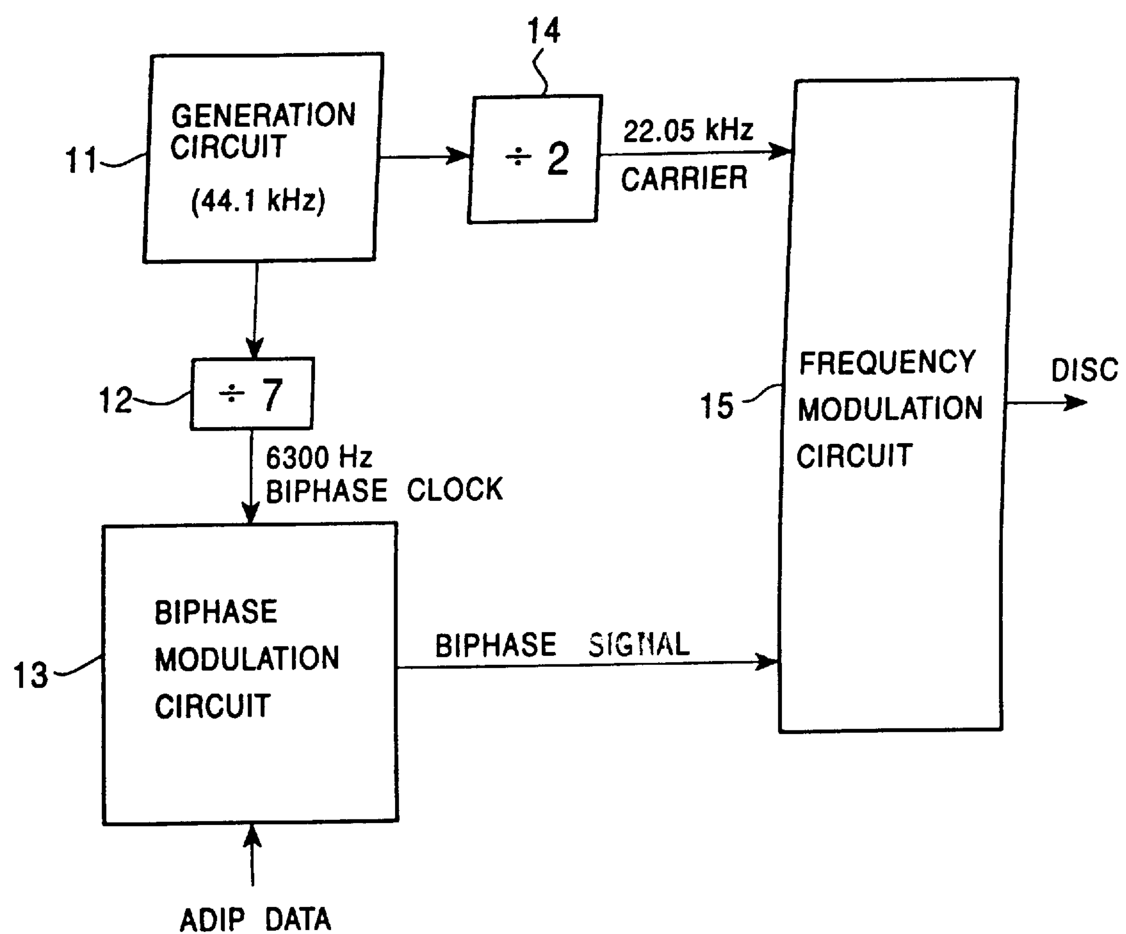
FIG. 9 is a block diagram of an example of a wobbling signal generation circuit.

FIG. 9 shows the configuration of an example of a circuit for generating a wobbling signal for wobbling the pregroove 2. A generation circuit 11 generates a signal having a frequency of 44.1 kHz. This frequency of 44.1 kHz is equal to that of the sampling clock for recording audio data on a Mini Disc (trademark).

A signal generated by the generation circuit 11 is supplied to a division circuit 12 to be divided by 7. A biphase clock signal having a frequency of 6300 Hz thereby formed is supplied to a biphase modulation circuit 13. The biphase modulation circuit 13 is also supplied with address-in-pregroove (ADIP) data.

This ADIP data is prepared as data corresponding to unit sectors, and each sector is prescribed as shown in FIG. 10. That is, the initial four bits form a sync signal, the next eight bits are upper eight bits representing the cluster number, and the eight bits following next are lower eight bits representing the cluster number. The further following eight bits represent the sector number. The remaining fourteen bits form a CRC signal for error detection and correction.

The biphase modulation circuit 13 biphase-modulates the biphase clock supplied from the divider 12 with the ADIP data supplied from an unillustrated circuit, and outputs a biphase signal to a frequency modulation circuit 15. The frequency modulation circuit 15 is also supplied with a 22.05 kHz carrier obtained by dividing the 44.1 kHz signal from the generation circuit 11 by 2 in a divider 14. The frequency modulation circuit 15 frequency-modulates this input from the divider 14 with the biphase signal supplied from the biphase modulation circuit 13, and outputs a frequency-modulated signal (FM signal) thereby obtained. The left and right side walls of the pregroove 2 are formed (wobbled) in accordance with this FM signal.

Figure 11:
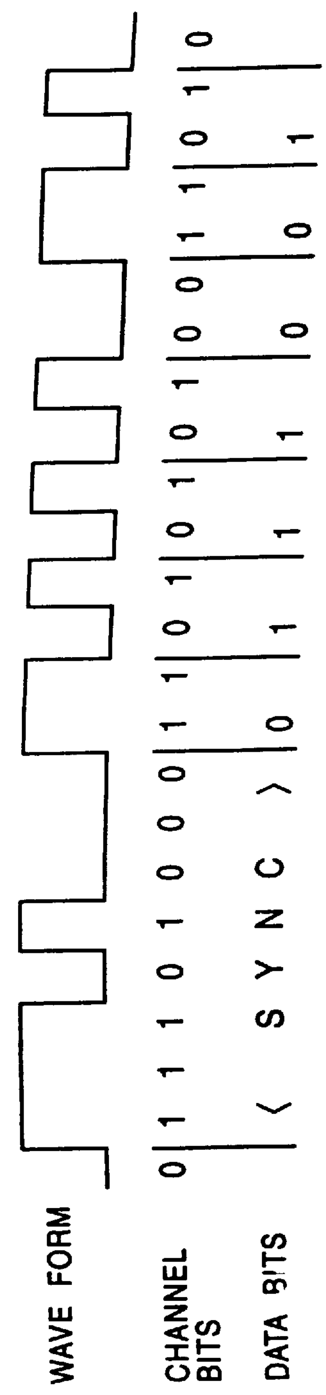
FIG. 11 is a diagram of a biphase signal.
Figure 12:
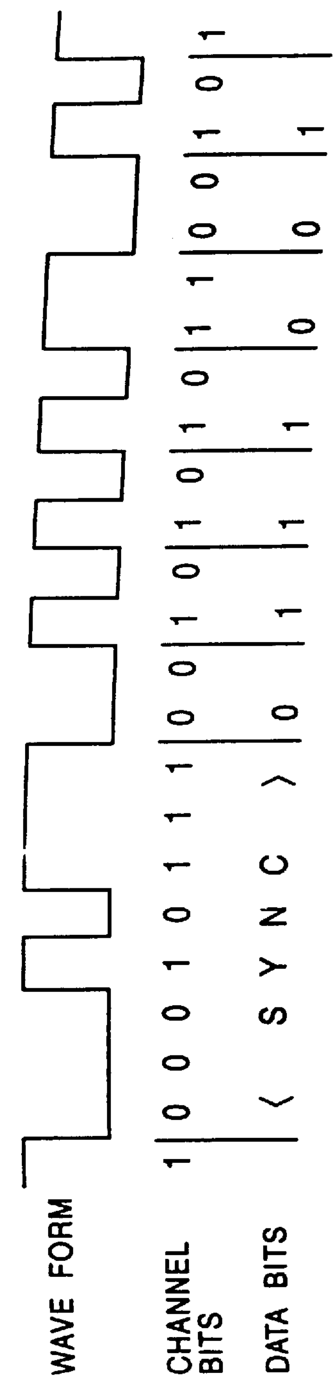
FIG. 12 is a diagram of another biphase signal.

FIGS. 11 and 12 show examples of the biphase signal output from the biphase modulation circuit 13. In this embodiment, if the preceding bit is 0, "11101000" is used as a sync pattern, as shown in FIG. 11. If the preceding bit is 1, "00010111" is used as a sync pattern, as shown in FIG. 12.

Data bits are biphase-modulated and converted into channel bits. SYNC bits are formed in an irregular pattern not appearing in the result of this modulation. "WAVEFORM" is obtained by converting the channel bits into patterns of 1 and 0.

Figure 13:
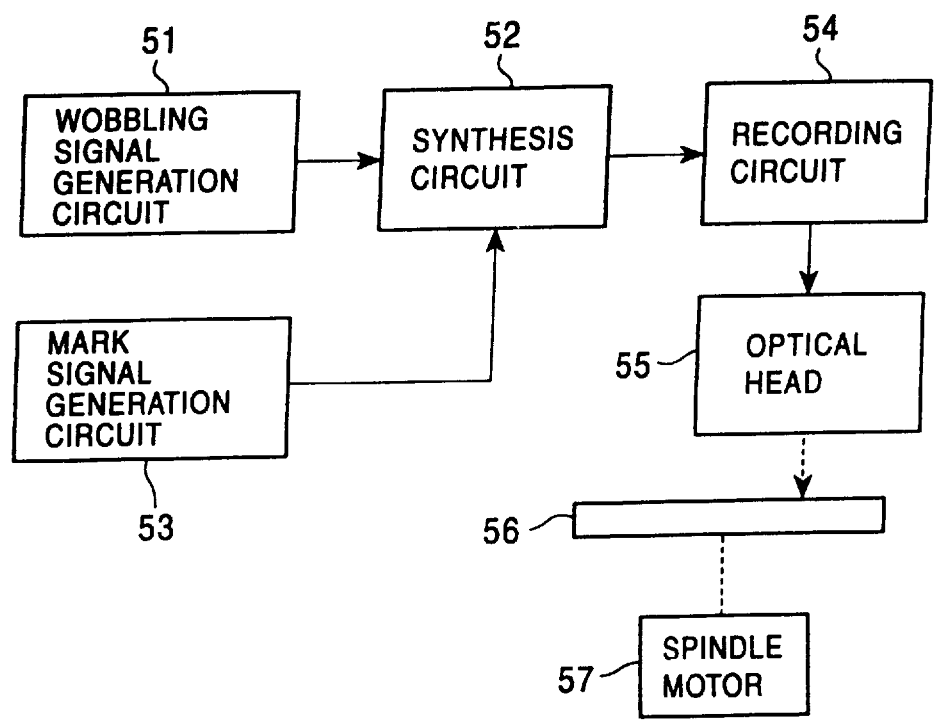
FIG. 13 is a block diagram of an example of a recording apparatus in accordance with the present invention.

FIG. 13 shows the configuration of an example of a reproducing apparatus which records data on disc 1 with a pregroove in accordance with the present invention. A wobbling signal generation circuit 51 has the same configuration as that shown in FIG. 9, and outputs an FM signal to a synthesis circuit 52. A mark signal generation circuit 53 generates a mark signal when the sync mark or the reference mark is formed, and outputs the mark signal to the synthesis circuit 52. The synthesis circuit 52 combines the FM signal output from the wobbling signal generation circuit 51 and the mark signal output from the mark signal generation circuit 53 and outputs a combined signal to a recording circuit 54. The recording circuit 54 controls an optical head 55 in accordance with the signal output from the synthesis circuit 52 to generate laser light for forming the pregroove, sync marks and reference marks on a master disc 56. A spindle motor 57 is adapted to rotate the master disc 56 at a predetermined speed.

That is, the FM signal generated by the wobbling signal generation circuit 51 is combined in the synthesis circuit 52 with the mark signal output from the mark signal generation circuit 53, and the combined signal is input to the recording circuit 54. The recording circuit 54 controls the optical head 55 in accordance with the signal supplied from the synthesis circuit 52 to generate laser light. The master disc 56 rotated at a predetermined speed by the spindle motor 57 is irradiated with the laser light generated by the optical head 55.

The master disc 56 then undergoes a development process, a stamper is formed from the master disc 56, and a multiplicity of discs 1 are formed as a replica from the stamper. Thus, disc 1 having the above-described pregroove 2 having sync marks S and reference marks R formed therein is obtained.

FIG. 14 shows the configuration of an example of a recording and reproducing apparatus for recording or reproducing data on disc 1 thus obtained. A spindle motor 31 is adapted to rotate disc 1 at a predetermined speed. An optical head 32 is arranged to record data on disc 1 by irradiating disc 1 with laser light and to reproduce data from reflected light from disc 1. A recording and reproducing circuit 33 temporarily stores, in a memory 34, recording data supplied from an unillustrated unit. When an amount of data corresponding to one sector (or one cluster) set as a recording unit is stored in the memory 34, the recording and reproducing circuit 33 reads out this onesector data, modulates the data by a predetermined method, and outputs the data to the optical head 32. The recording and reproducing circuit 33 suitably demodulates data supplied from the optical head 32 and outputs the demodulated data to the unillustrated unit.

An address generating and reading circuit 35 generates an address to be recorded in the track (pregroove 2) in accordance with the control of a control circuit 38 and outputs the address to the recording and reproducing circuit 33. The recording and reproducing circuit 33 adds this address to recording data supplied from the unillustrated unit and outputs the address and data to the optical head 32. If reproduction data reproduced by the optical head 32 from the track of the disc 1 contains address data, the recording and reproducing circuit 33 separates the address data and outputs the address data to the address generating and reading circuit 35. The address generating and reading circuit 35 outputs the read address to the control circuit 38.

A mark detection circuit 36 detects components corresponding to sync mark S and reference mark R from a radio frequency (RF) signal supplied as a reproduction output from the optical head 32. A wobbling information reading circuit 37 reads out address information (wobbling information) contained in the wobbling signal from the reproduced RF signal output from the optical head 32 and outputs the result of this reading to the control circuit 38.

A mark cycle detection circuit 40 determines a periodicity of detected pulses which are output when sync marks S and reference marks R are detected by the mark detection circuit 36. That is, since sync marks S (reference marks R) are generated with a constant period, determination is made as to whether detected pulses supplied from the mark detection circuit 36 are those generated with this constant period. If the detected pulses are pulses generated with the constant period, the mark cycle detection circuit 40 generates pulses in synchronization with the detected pulses and outputs the generated pulses to a phase comparator 42 of a subsequent phase lock loop (PLL) circuit 41. If detected pulses are not supplied with a constant period, the mark cycle detection circuit 40 generates pseudo pulses by a predetermined timing to prevent the subsequent PLL circuit 41 from being locked in an incorrect phase.

The PLL circuit 41 has, ac well as the phase comparator 42, a low-pass filter 43, a voltage controlled oscillator (VCO) 44 and a divider 45. The phase comparator 42 compares the phases of the input from the mark cycle detection circuit 40 and an input from the divider 45 and outputs a phase error therebetween. The low-pass filter 43 compensates the phase of the phase error signal output from the phase comparator 42 and outputs the compensated signal to the VCO 44. The VCO 44 generates a clock having a phase corresponding to the output from the low-pass filter 43 and outputs this clock to the divider 45. The divider 45 divides the frequency of the clock supplied from the VCO 44 and outputs th e result of this dividing to the phase comparator 42.

The clock output from the VCO 44 is supplied to each circuit and also to a sector counter 46. The setor counter 46 counts the number of clock pulses output from the VCO 44 by referring to a reference mark detection signal which is generated by the mark detection circuit 36 when reference mark R is detected. When the count value becomes equal to a certain value previously set (a value corresponding to the length of one sector), the sector counter 46 generates a sector start pulse and outputs this pulse to the control circuit 38.

A thread motor 39 is controlled by the control circuit 38 to move the optical head 32 to a predetermined track position on the disc 1. The control circuit 38 controls a spindle motor 31 to rotate the disc 1 at a predetermined speed.

Figure 15:
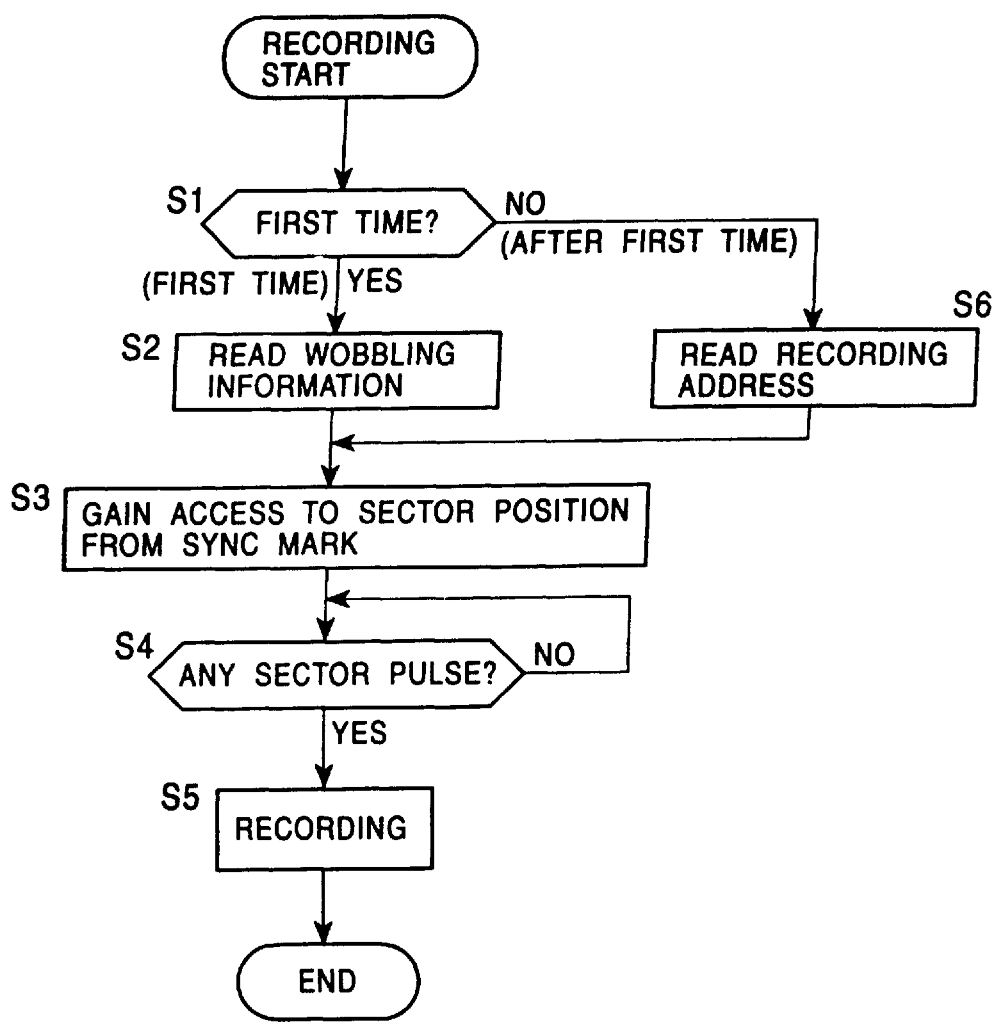
FIG. 15 is a flowchart of the operation at the time of recording of the apparatus shown in FIG. 14.

The operation at the time of recording of the data recording and reproducing apparatus shown in FIG. 14 will next be described with reference to the flowchart of FIG. 15. First, in step S1, determination is made as to whether disc 1 has data already recorded. This determination can be made by reading a flag recorded at a predetermined position on the disc 1 (e.g., in an innermost or outermost control track). Then, for example, the control circuit 38 controls the thread motor 39 to gain access to the predetermined position on the disc 1 (control track) with the optical head 32. The data (flag in this case) recorded at the accessed position is then read out with the optical head 32. The control circuit 38 makes the recording and reproducing circuit 33 demodulate the output from the optical head 32 and fetches the result of the demodulation. The control circuit 38 then makes determination from the fetched result as to whether the disc 1 has data already recorded.

If it is determined in step S1 that the present recording is a first time recording, the process advances to step S2 to read out optical head 32 position information from wobbling information. That is, the optical head 32 irradiates the disc 1 with laser light and outputs RF signal obtained from reflected light from the disc. The wobbling information reading circuit 37 reads wobbling information (address information) from this RF signal and outputs the result of this reading to the control circuit 38.

In step S3, the control circuit 38 gains access to a desired recording position with the optical bead 32. That is, the control circuit 38 moves the optical head 32 to the predetermined position by controlling the thread motor 39 so that address information output from the wobbling information reading circuit 37 becomes equal to the information of the address with which data is to be recorded. Simultaneously, the control circuit 38 determines the sector position by counting sector start pulses output from the sector counter 46 after referring to the reference mark detection signal output from the mark detection circuit 36.

In step S4, the control circuit 38 monitors the output from the sector counter 46 and awaits input of a sector start pulse. When a sector start pulse is input, the process advances to step S5 to start recording operation.

That is, the control circuit 38 makes the recording and reproducing circuit 33 read out data corresponding to one sector (one cluster) in data supplied from the unillustrated unit and stored in the memory 34 through the recording and reproducing circuit 33 and supply this data to the optical head 32. The optical head 32 irradiates the disc 1 with laser light corresponding to the input data, thereby starting recording of the data corresponding to one sector from the position of one of the sync marks S (or reference mark R) on the disc 1. Groups of data corresponding to necessary sectors are then recorded successively.

When this recording is completed, a flag which indicates that the first time recording has been performed is recorded at the predetermined position (control track) on the disc 1.

During recording, the control circuit 38 also makes the address signal generating and reading circuit 35 generate addresses corresponding to recording positions on the disc 1 and supply the addresses to the recording and reproducing circuit 33. The recording and reproducing circuit 33 supplies the addresses to the optical head 32 by adding them to the recording data. Thus, address data indicating the recording positions of the recording data is recorded together with the recording data.

If data is recorded at least once as described above, it is determined in step S1 that data recording has already been made. The process then moves from step S1 to step S6 and the control circuit 38 executes the processing for reading out address information from the data recorded in the track.

That is, the control circuit 38 makes the optical head 32 reproduce the data recorded in the track of the disc 1 and makes the recording and reproducing circuit 33 demodulate the reproduced data output from the optical head 32. The address generating and reading circuit 35 reads address data from the data reproduced and demodulated by the recording and reproducing circuit 33 and outputs the result of this reading to the control circuit 38. The control circuit 38 determines the present position of the optical head 32 on the basis of the address data read from the recording data. The process then proceeds to step S3 to perform the subsequent processing in the same manner as in the above-described case.

That is, the present position is read from the address data existing in the recording data, and the optical head 32 is controlled so that the read position becomes equal to the desired recording position. When the optical head 32 outputs a sector start pulse at the desired position, recording of data corresponding to one sector is started from that position.

Thus, data recording is performed on the basis of sector start pulses. Therefore, accumulation of errors of the recording position can be prevented even if the recording operation is performed intermittently.

On the other hand, at the time of reproduction, the control circuit 38 gains access to a desired track position with the optical bead 32 by controlling the thread motor 39. At this time, the control circuit 38 determines the present position of the optical head 32 from the output of the address generating and reading circuit 35. When the present position reaches the desired address position, a sector start pulse is detected. Reproduced data thereafter supplied is stored in the memory 34 through the recording and reproducing circuit 33 as data in the sectors to be reproduced. The same data is again read out to be supplied to the unillustrated unit from the recording and reproducing circuit 33.

If an instruction to read out sector data stored in the memory 34 is issued, the corresponding sector data recorded in the memory 34 is read out and output to the unillustrated unit.

Figure 16:
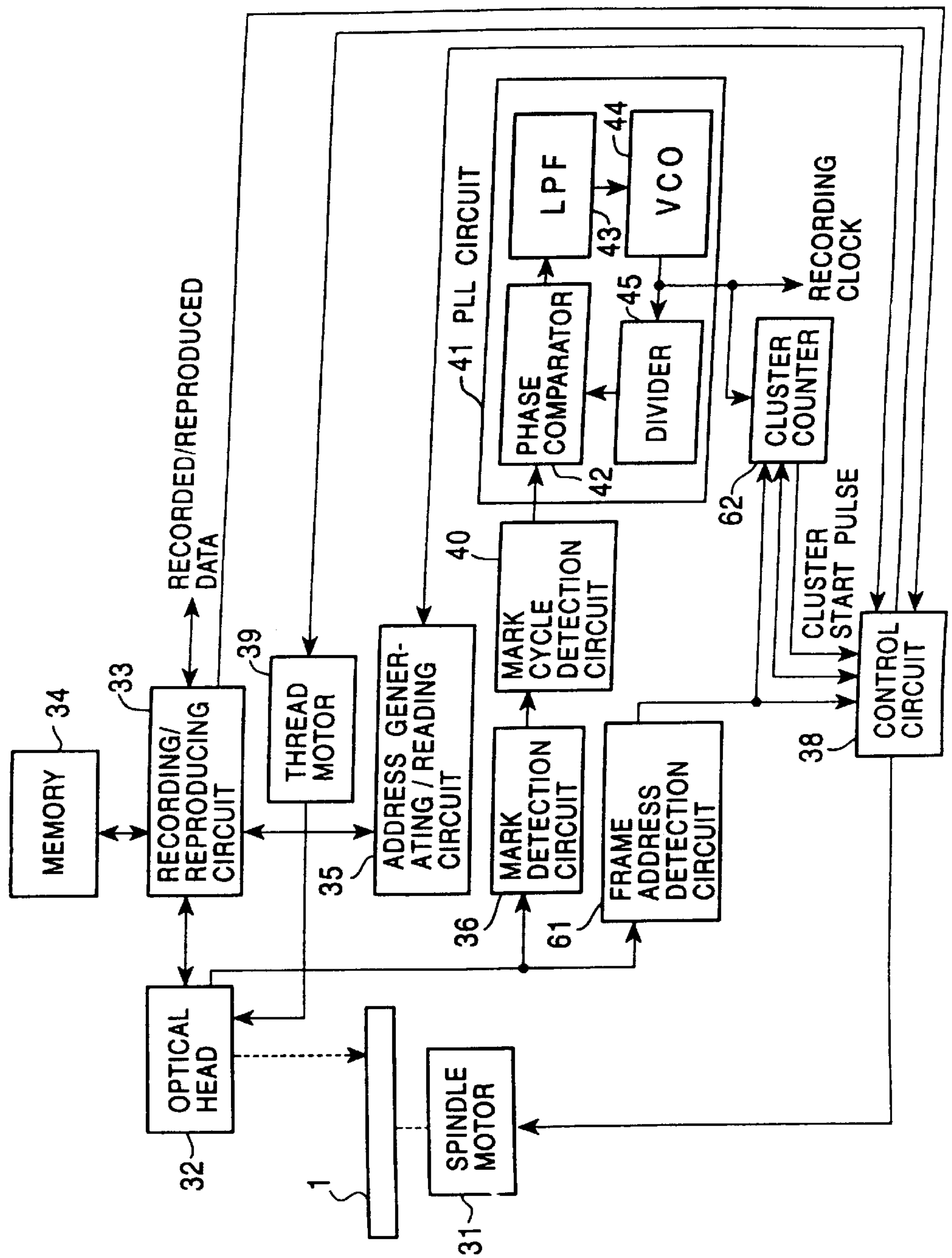
FIG. 16 is a block diagram of another optical disc recording/reproducing apparatus in accordance with the present invention.

FIG. 16 shows the configuration of a second example of the recording and reproducing apparatus for recording or reproducing data on disc 1 having a pregroove. In the second example, a frame address detection circuit 61 is provided in place of the wobbling information detection circuit 37 of the second example and a cluster counter 62 is also provided in place of the sector counter 46.

The frame address detection circuit 61 detects frame addresses by reading out address information included in the wobbling signal from the RF signal output from the head 32 and supplies the frame addresses to the cluster counter 62.

The clock output from the VCO 44 is supplied to each circuit and also to the cluster counter 62. The cluster counter 62 counts the number of pulses of the clock output from the VCO 44 by referring to each frame address supplied from the frame address detection circuit 61. When the count value becomes equal to a certain value previously set (a value corresponding to the length of one cluster), the cluster counter 62 generates a cluster start pulse and outputs this pulse to the control circuit 38.

The operation of this apparatus will be described with respect to data recording. The optical head 32 irradiates the disc 1 with laser light and outputs an RF signal obtained from reflected light from the disc 1. The frame address detection circuit 61 reads wobbling information (address information) from this RF signal and outputs the result of this reading to the control circuit 38 and to the cluster counter 62. This wobbling information is also input to the mark detection circuit 36. Clock sync marks are detected in the mark detection circuit 36 and supplied to the mark cycle detection circuit 40.

The mark cycle detection circuit 40 determines a periodicity of the clock sync marks, generates corresponding predetermined pulses and outputs these pulses to the PLL circuit 41. An output from the PLL circuit 41 is supplied to the cluster counter 62.

The control circuit 38 can detect the position of the reference clock sync mark in one track round from the frame addresses supplied from the frame address detection circuit 61 and the configuration of wobbling address frames. On the basis of this position, an arbitrary position on the track can be accessed with the recording clock.

Figure 17:
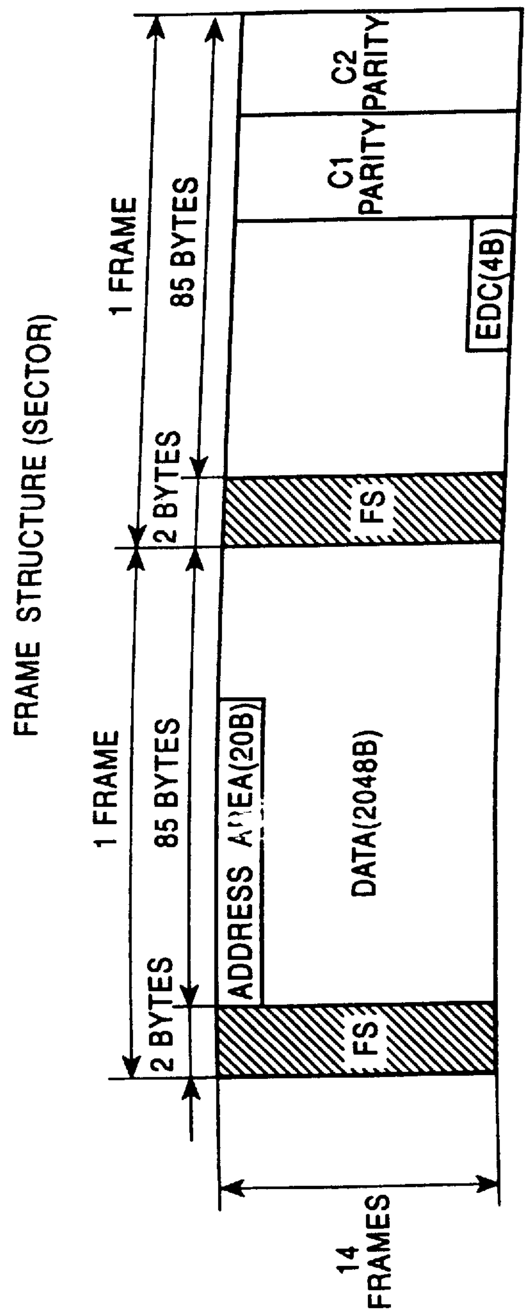
FIG. 17 is a diagram of an example of the sector format of a high-density compact disc read only memory already proposed.

FIG. 17 shows an example of the sector format of a high-density CD-ROM already proposed. In this example, the length of one sector is 2 kilobytes. In one frame, eighty five bytes form a data area and leading two bytes form a frame sync (FS) signal. The beading twenty bytes in the sector form an address area in which a sector address and a track address are recorded. In the area following the address area, predetermined data is recorded.

As shown in FIG. 17, two frames are defined in the lateral direction while fourteen frames are defined in the longitudinal direction; a total of twenty eight frames having 2 kilobytes (2048 bytes) form the data area of one sector. Error-detecting codes (EDC) of four bytes are provided for 2048-byte data.

At the right end of two frames arranged horizontally, 8-bit parity code C1 and 14-bit parity code C2 are provided. These are error-correcting codes which are respectively set for 170-byte data in the two frames. The series C1 is set with respect to the data in two frames in the lateral direction (horizontal direction) as viewed in FIG. 17 while the series C2 is encoded in an interleaved relationship with the series C1. That is, it is set with respect to 170-byte data (340 frames) along a direction from an upper left position to a lower right position (oblique direction).

Figure 18:
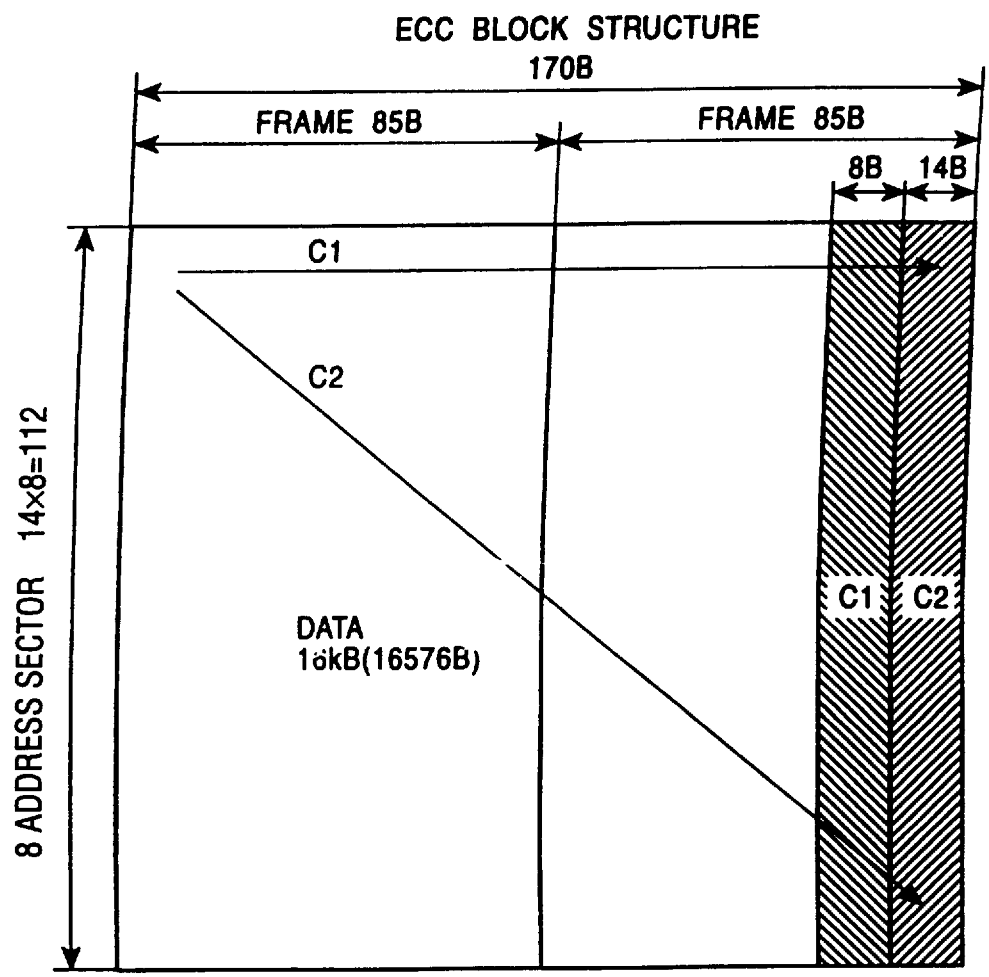
FIG. 18 is a diagram of an example of an error checking code structure for clusters.

FIG. 18 shows an example of an error-correcting code structure (ECC) for clusters. One cluster is formed of 16 kilobytes of eight sectors. As shown in FIG. 18, the error-correcting code C2 series is completed in one cluster.

Figure 19:
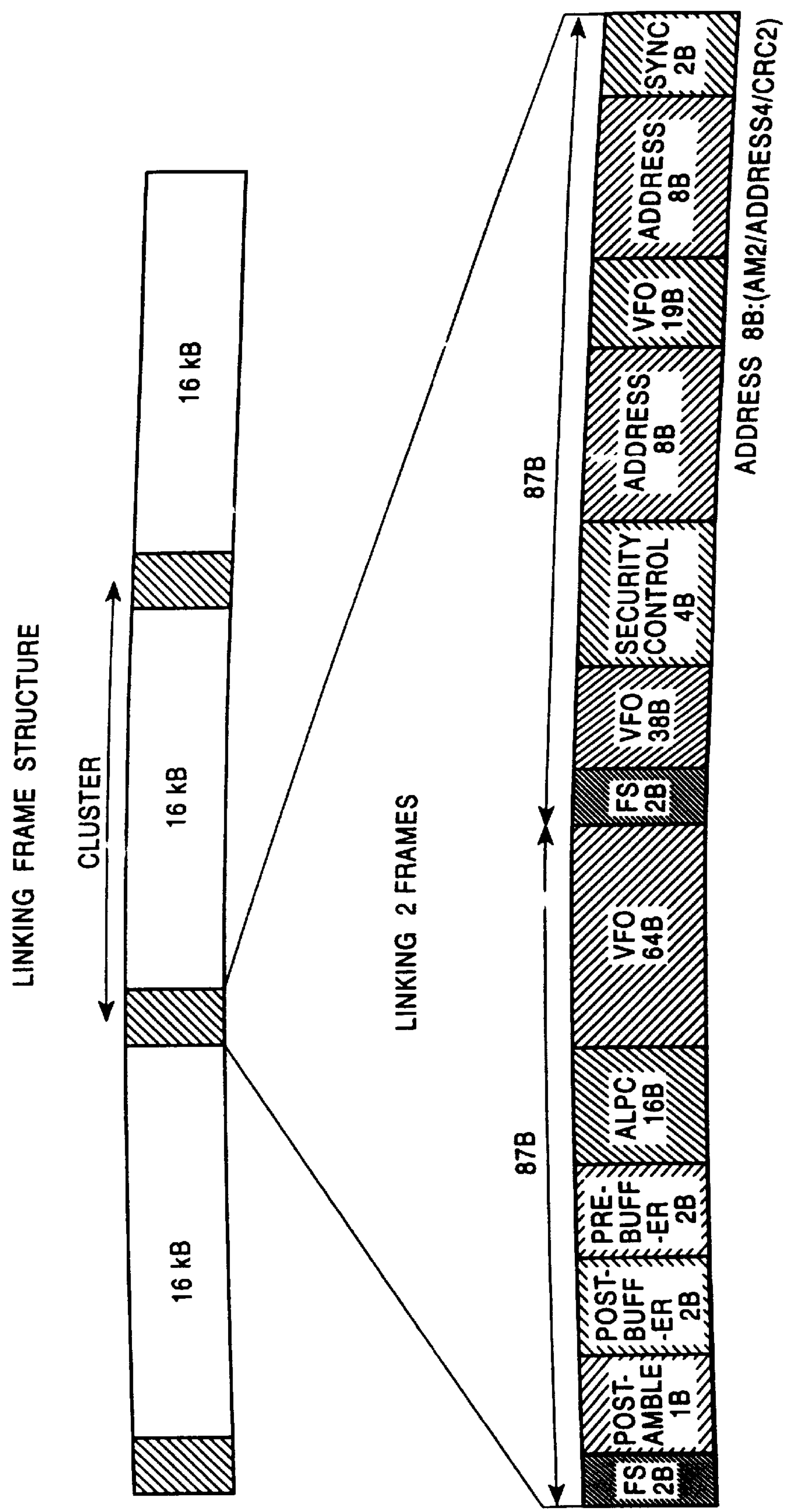
FIG. 19 is a diagram of an example of a linking area structure.
Figure 20:
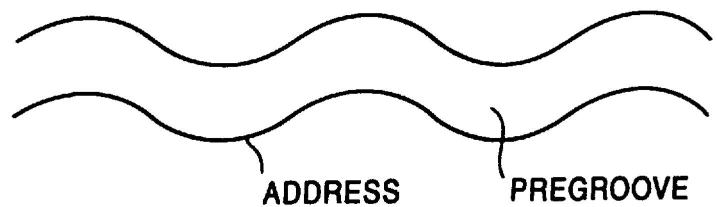
FIG. 20 is a diagram of address recording by wobbling.
Figure 21:
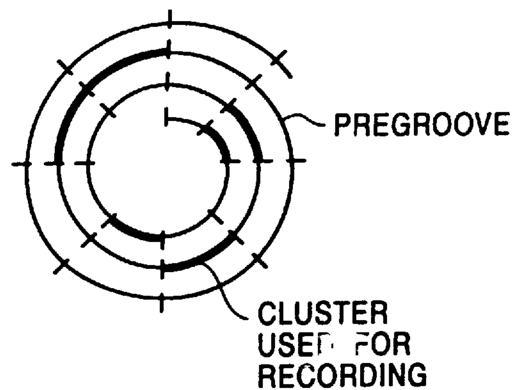
FIG. 21 is a diagram of intermittent recording.
Figure 22:
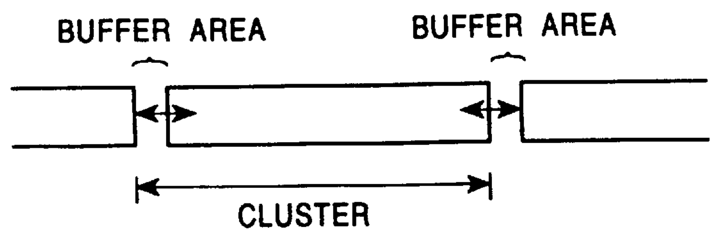
FIG. 22 is a diagram of variation of a cluster recording position.

FIG. 19 shows an example of a linking area structure. Linking areas are formed between clusters. Each linking area is formed of two frames. Date in one frame is eighty five bytes, as in the case of the data area. A frame sync (FS) signal of two bytes is provided at the starting end of each frame. A postamble and a postbuffer pertain to the preceding cluster. In the postamble, data for controlling the mark length of the last data to restore a signal polarity is recorded. The postbuffer is an buffer area for absorbing jitter due to an eccentricity or the like.

A prebuffer and other subsequent areas pertain to the cluster subsequently recorded. The prebuffer is a buffer for absorbing variation of the cluster start position. The next sixteen bytes are used for automatic laser power control (ALPC), that is, these sixteen bytes form a recording power setting area for storing data for setting the laser output at the time of recording or reproduction to a predetermined value. The next sixty four bytes form a VFO area in which PLL pull-in data is recorded, that is, a clock for executing pull-in operation in the PLL circuit 41 shown in FIG. 16 is recorded.

A 38-byte VFO area follows the FS signal of the next frame. PLL circuit pull-in data for recording data is recorded in this area. Four bits for security control follow the VFO area.

For security control, copy protective information is recorded. For example, if copy protective information is recorded in the data area, it may be treated as data and freely read out or rewritten from a host computer, resulting in failure to operate for protection. On the other hand, if copy protective information is recorded in the link area, it functions as a highly effective protective information because the information in the link area is not data to be read out and because this area cannot be accessed from the host computer.

Subsequent 8-byte address data is formed of a 2-byte address mark (AM), 4-byte track and cluster address data and a 2-byte error-detecting code (CRC). As the above-described VFO and address data, substantially the same data is recorded two times in order to increase the address detection probability. As VFO data, however, 38 bytes are recorded a first time and 19 bytes are recorded a second time. Finally, a 2-byte sync area for data start synchronization is provided, in which a sync signal indicating a recording data start position is recorded.

In this embodiment, as described above, the frequency of wobbling in the clock mark sync area is set to the center frequency of modulation frequencies different from the wobbling frequency of wobbling address information, thereby enabling the clock mark area and, hence, the clock sync mark to be easily detected without affecting the detection of the wobbling address information. If a plurality of clock sync marks are formed in one track round, the recording clock can be accurately reproduced from the period with which the clock sync marks are detected. In this manner, the recording or reproduction sector position can be determined with improved accuracy and jitter due to an eccentricity or the like can be limited. As a result, high-density random recording and reproduction can be achieved. Also, the need for increasing the buffers between clusters is eliminated to achieve recording and reproduction at a higher density.

Also, recorded data is formed as data frames while overhead areas such as headers for recording and reproduction are formed of unit frames, thereby reducing overhead and enabling recording and reproduction at positions randomly selected. Also, a common format is provided for a high-density CD-ROM for playback only and the data area, and the configuration of the sync system of the link area is formed so as to conform to the format of recording data, thereby enabling use of a common sync system as well as a common configuration for hardware for playback only and the optical disc apparatus.

This link area can also be applied to a ROM disc to enable the ROM disc and the RAM disc to have a common format. In such a case, in the ROM disc, information can be recorded in the postbuffer, the prebuffer and the ALPC region in the link area. For example, VFO data may be recorded for continuity of PLL from the preceding cluster, or an address may be recorded to increase the address information probability.

The lengths (the numbers of bytes) of the areas are shown by way of example with respect to the above-described embodiments and may be set to predetermined values selected as desired.

What is claimed is:

1. An optical disc comprising at least one track on which data is recorded and which is previously formed as a pregroove wobbled in accordance with address information, said track having a plurality of frames wobbled in accordance with the address information, a plurality of sync marks being formed in each of said frames by wobbling said pregroove at a frequency higher than a frequency of wobbling with the address information.

2. An optical disc according to claim 1, wherein the address information includes at least data corresponding to a sync signal, data corresponding to a track address, data corresponding to a frame address, and data corresponding to an error-detecting code.

3. An optical disc according to claim 1, wherein said sync marks are formed in a plurality of sync mark areas provided in each frame.

4. An optical disc according to claim 3, wherein the length of each of the sync mark areas has at least a unit corresponding to the length of one bit of the address information.

5. An optical disc comprising:

at least one track on which data is recorded and which is previously formed as a pregroove wobbled in accordance with address information, said track being divided into a plurality of sectors, a plurality of sync marks being formed in each of said sectors;

wherein each of said sync marks is formed by wobbling said pregroove at a frequency higher than a frequency of wobbling with the address information.

6. The optical disc of claim 5 wherein at least one of said sync marks in one round of said track is formed as a reference mark different from the other sync marks.

7. The optical disc of claim 6 wherein said optical disc is a disc having a constant linear velocity, said sync marks being formed so that a length corresponding to an integer-multiple of a period of formation of said sync marks defines one sector, said reference mark being formed at the starting end of the first of the sectors in one round of the track.

8. The optical disc of claim 5 wherein each of said sync marks is formed by discontinuously forming said pregroove.

9. The optical disc of claim 5 wherein each of said sync marks is formed by pits.

10. The optical disc of claim 5 wherein one track includes 200 sync marks formed therein.

11. The optical disc of claim 6 wherein said reference mark is formed by wobbling said pregroove at a frequency higher than the frequency of wobbling for the sync mark.

12. The optical disc of claim 8 wherein at least one of said sync marks in one round of said track is formed as a reference mark different from the other sync marks, and further, wherein said reference mark is formed so that the spacing of the discontinuities for said reference mark is different from the spacing of the discontinuities for said sync marks.

13. The optical disk of claim 9 wherein at least one of said sync marks in one round of said track is formed as a reference mark different from the other sync marks, and further, wherein said pit forming said reference mark differs in size from said pits which form said sync marks.

14. The optical disc of claim 6 wherein said optical disc is a disc having constant angular velocity, each of said sync marks and said reference mark for each track is disposed on the same radial line as the corresponding sync marks and reference marks for the other tracks.

15. The optical disc of claim 14 wherein said reference marks are disposed on one radial line in said optical disc.

16. The optical disc of claim 14 wherein the sector boundary lies between two sync marks disposed on two respective radially adjacent lines.

17. The optical disc of claim 1 wherein said optical disc is a disc having constant angular velocity, and further, wherein one track round on said disc includes eight frames wobbled therein.

18. The optical disc of claim 2 wherein each of said frame includes data of sixty bits, and further, wherein said data corresponding to a sync signal is four bits, said data corresponding to a track address is twenty bits, said data corresponding to a frame address is four bits, and said data corresponding to an error-detecting code is fourteen bits.

19. The optical disc of claim 2 wherein said sync signal is indicative of the starting end of the corresponding frame.

* * * * *